June 23, 1931.  J. M. G. FULLMAN  1,810,958
ARMORED CABLE CONNECTER FITTING
Filed Feb. 17, 1930
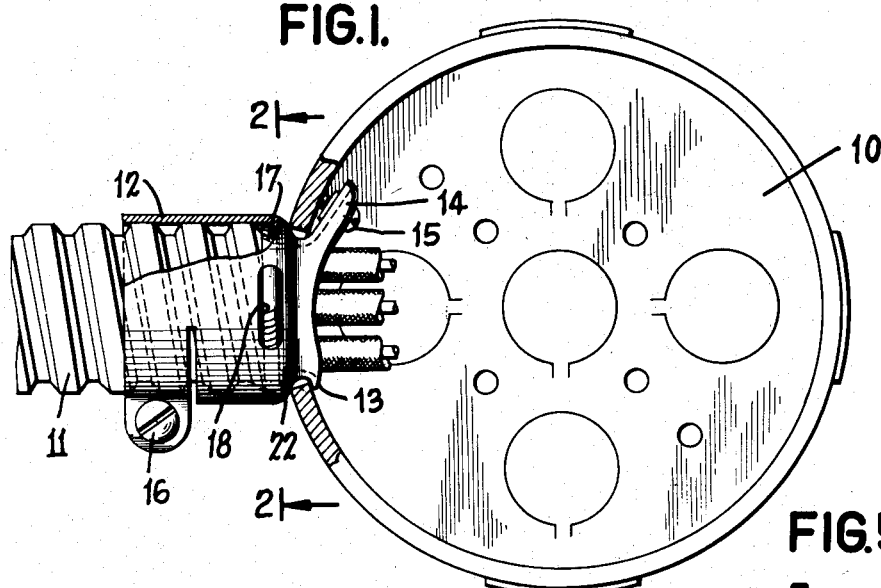
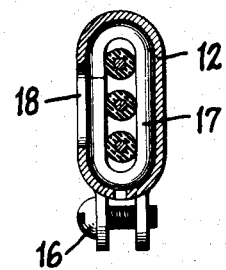
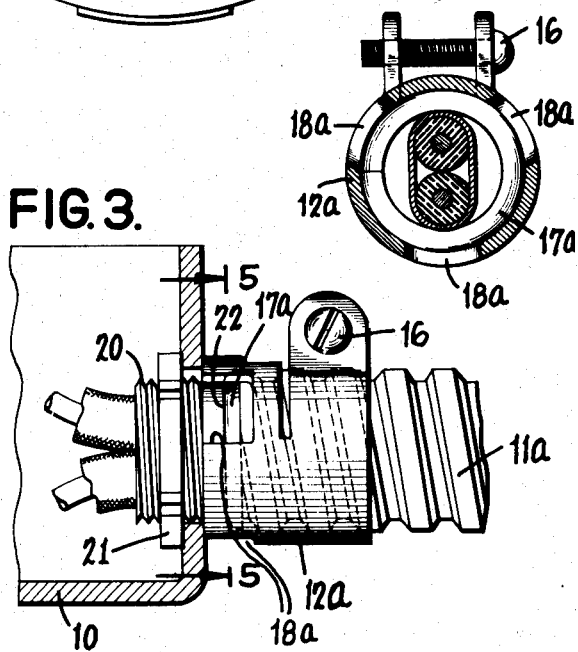
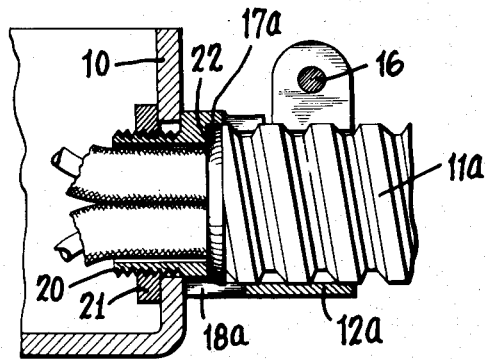
Inventor
James M. G. Fullman
By his Attorneys
Cooper, Kerr & Dunham Patented June 23, 1931

1,810,958

UNITED STATES PATENT OFFICE

JAMES M. G. FULLMAN, OF SEWICKLEY, PENNSYLVANIA, ASSIGNOR TO NATIONAL ELECTRIC PRODUCTS CORPORATION, OF NEW YORK, N. Y., A CORPORATION OF DELAWARE

ARMORED CABLE CONNECTER FITTING

Application filed February 17, 1930. Serial No. 428,882.

This invention relates to clamps and connecter fittings for armored cable and the like and more particularly relates to a connecter fitting provided with an inspection aperture or apertures therein in such relationship that an insulating bushing disposed within the fitting may be inspected after the fitting has been applied to a cable and to a box or other part.

More particularly the invention relates to a connecter fitting provided with an inspection aperture or apertures which permit an insulating bushing which is disposed within the end of an armored cable to be inspected notwithstanding the fact that the cable terminates short of the box wall and within the connecter fitting.

Further and other objects of the present invention will be hereinafter set forth in the accompanying specification and claims and shown in the drawings which by way of illustration show preferred embodiments of my invention.

In the drawings:

Figure 1 shows an elevational view with certain parts in section of a box having a connecter fitting applied thereto and with one form of inspection aperture in such fitting;

Fig. 2 is a detail sectional view taken on lines 2—2 of Fig. 1;

Fig. 3 is a view of a modification wherein a plurality of inspection apertures are provided in a slightly different form of clamp;

Fig. 4 is a central transverse sectional view of the same parts shown in Fig. 3; and Fig. 5 is a detailed sectional view of the same parts, the section being taken on lines 5—5 of Fig. 3 and looking in the direction of the arrows.

In more detail in the drawings, the part 10 in Figs. 1, 3 and 4 represents a box used in electrical wiring installations. In Fig. 1, 11 represents armored cable of oval configuration in cross-section. 12 is the body portion of the connecter fitting or clamping device. In the embodiment shown in Fig. 1, this connecter fitting is provided with a box receiving portion comprising a shouldered portion 13 and with a tongue portion 14 receiving a screw 15 for fastening the connecter fitting or clamp in an aperture in the box. The connecter fitting is also provided with the usual clamping portion provided with tightening screw 16 for tightening the clamping portion upon the inserted armored cable. The part designated 17 represents the end of an insulated fibre bushing which is inserted within the armored cable and at the end thereof.

In installations of this sort it will be appreciated that the end of the bushing 17 is completely obscured when viewed from within the box by the abutting shouldered portion 22 of the connecter fitting and in order to provide for the inspection of the bushing after the parts have been assembled together, and with the cable 11 in place, an inspection aperture 18 is provided extending through the wall of the connecter fitting at a point outside of the box which permits an inspector to examine the assemblage and note that the insulating bushing is properly disposed and in place in the end of the armored cable.

According to the embodiment of the invention shown in Figs. 3 to 5 inclusive, the armored cable 11 is of round cross-section. Such cable is designated 11a. The connecter fitting 12a is clamped down upon the cable 11a in the usual manner by means of the clamping portion and by the screw 16 and this fitting has an extended threaded end 20 adapted to receive a clamping nut 21 to clamp the connecter fitting to the box wall. In place of having a single inspection aperture in the fitting, preferably according to this embodiment of the invention, several inspection apertures 18a are provided so that inspection may be made from several angles. These apertures are preferably slotted out in the clamping element 12a and extend into the body part of such member to such an extent as to extend over the end of the insulating bushing 17a. As clearly shown in Fig. 4, the bushing 17a abuts against a shoulder portion 22 of the connecter fitting and for this reason cannot be inspected from within the box. However, the inspection apertures 18a which are disposed outside of the box wall permit easy inspection of this bushing after assembly is complete. The slots which form the inspection apertures 18a preferably extend from the point where the intermediate part of the fitting abuts the box wall to a point somewhat beyond the shouldered portion 22 (see Fig. 3).

It will be appreciated that the invention is not limited to any particular number of inspection apertures. Any number can be provided as desired.

By providing the internal shoulders 22 in the various fittings, a seat is provided against which the ends of the insulating bushings may abut and such seat prevents subsequent displacement of the bushings after the assembly is complete.

What I claim is:

1. A connecter fitting having a body portion, a clamping portion to clamp upon an inserted armored cable and a portion adapted to extend through a box wall, said connecter fitting also being provided at a point in the body portion which is without the box wall when the fitting is in assembled relation thereto with an inspection aperture disposed and related to provide for the inspection of the end of an insulating bushing, which bushing is within the armored cable and which bushing has its end which is to be inspectable projecting over the terminating end of the armored cable and disposed within the connecter fitting.

2. A connecter fitting having a clamping portion, a box receiving portion and an intermediate body portion, and including in combination, a shoulder within the body portion intermediate its ends adapted to form a seat for the end of a bushing inserted in an armored cable and clamped in the connecter fitting, said body portion having an inspection aperture therein extending through the wall at a point adjacent the shoulder to permit inspection of the insulating bushing from without the box with the parts in assembled relation.

3. The invention set forth in claim 1 in which the body portion is provided with a plurality of inspection apertures which are provided to permit inspection of the end of the insulating bushing projecting over the end of the armored cable from various angles.

4. The invention set forth in claim 2 in which the body portion is provided with a plurality of inspection apertures to provide for the inspection of the bushing from one of several angles.

5. The invention set forth in claim 2 in which the body portion is provided with inspection apertures formed by slotted out portions which extend into the body portion at points overlying the shouldered portion and slightly beyond such shouldered portions.

6. A connecter fitting having a body portion recessed to receive an inserted armored cable, a clamping portion adapted to clamp upon the said cable, a bushing of insulating material within the armored cable and having a shouldered portion extending over the end of the armor which end of the cable terminates in the connecter fitting, said connecter fitting also having a portion adapted to extend through a box wall, said connecter fitting also having an inspection aperture in the wall of the body portion at a point in the body portion without the box wall when the fitting is in assembled relation thereto and which inspection aperture is disposed over the outwardly projecting part of the bushing and over the terminating end of the armored cable to provide for the inspection of the projecting part of the bushing with the parts in assembled relation.

7. A connecter fitting with a body portion shaped to receive an armored cable which cable has an insulating bushing disposed within the armor and which bushing has a shouldered portion extending outwardly and protecting the terminating end of the armor within the fitting, means for clamping the armored cable within the fitting, means in the fitting adapted for extension through a box wall, and an inspection aperture in the wall of the body portion away from the box wall, intermediate the clamping means and the said box wall, and disposed over the projecting end of the bushing at the terminating end of the armor of the cable to permit inspection of the bushing with the bushing and cable inserted and clamped in the connecter.

8. A connecter fitting having wall portions and having provisions for receiving and clamping an armored cable therein, said armored cable being provided with an insulating bushing therein disposed within the cable and projecting over the terminating end of the armor where it is received within the fitting, said fitting also having parts adapted to extend through and cooperate with a box wall and an inspection aperture in the wall of the connecter fitting disposed without the box wall when the fitting is in assembled relation thereto and disposed at a point over the projecting part of the insulating bushing at the terminating end of the armor for the purpose described.

9. A connecter fitting for cooperation with boxes and the like and with provisions for receiving and clamping an armored cable therein, the armored cable being provided at its terminating end within the connecter fitting with an insulating bushing, means in the connecter fitting for positioning the bushing slightly outside of the box wall, and an inspection aperture in the connecter fitting to permit inspection of the bushing which is disposed at the terminating end of the armor of the cable when the cable is clamped in the fitting.

10. A connecter fitting in cooperation with boxes and the like and with provisions for receiving and clamping an armored cable therein, the armored cable being provided at its terminating end within the connecter with an insulating bushing, which bushing is within the armor and which bushing also projects over the end of the armor at the terminating end thereof, and an inspection aperture in the connecter fitting disposed slightly without the box wall when the fitting is in assembled relation thereto and disposed over the projecting end of the insulating bushing at the terminating end of the armor for the purpose described.

In testimony whereof I hereto affix my signature.

JAMES M. G. FULLMAN.